3,408,313
PROCESS FOR POLYMERIZING 1,2-EPOXIDES
WITH AN ANIONIC INITIATOR
George Edward Foil, Runcorn, England, assignor to Imperial Chemical Industries Limited, London, England, a corporation of Great Britain
No Drawing. Filed Feb. 17, 1966, Ser. No. 528,059
14 Claims. (Cl. 260—2)

ABSTRACT OF THE DISCLOSURE

There is provided a process for the polymerization of 1,2-epoxides by contacting monomeric 1,2-epoxides free of interfering functional groups with an anionic initiator system comprising (i) a tetra ($\beta$-diketo chelate) of zirconium, and (ii) an aluminum alkyl selected from the trialkyl and dialkyl aluminum halides. The ratio of (i) to (ii) is chosen to give from 1.5 to 6 aluminum atoms for each zirconium atom in the composition. High yields of high molecular weight materials are obtained. The process produces a tough, self-adhesive rubber.

---

This invention relates to new initiator compositions, and more particularly to anionic initiator systems which include co-ordinate compounds of metals and are useful for initiating the polymerization of epoxides.

Epoxides may be polymerized by contact with anionic polymerization initiators, for example metal alkyls, but the polymers are generally of low molecular weight. Higher molecular weights may be obtained from the use of initiator systems wherein the metal alkyl is combined with certain activating compounds, for example water or alcohols. Systems comprising a metal alkyl in combination with certain transition metal chelates have also been found successful, with the chelates of cobalt generally giving the best results. However, their optimal use generally requires the enforcement of critical polymerization conditions, particularly with regard to the ratio of metal alkyl to activtor and the method of preparation of the polymerization mixture.

We have now discovered a combination of metal compounds which promotes rapid polymerization to high molecular weight products under generally less critical reaction conditions.

According to our invention we provide a composition useful as an epoxide polymerization initiator system and comprising (i) a tetra($\beta$-diketo-chelate) of zirconium and (ii) an aluminum trialkyl or dialkyl aluminium halide, the ratio of (i) to (ii) being chosen to give from one to six aluminium atoms for each zirconium atom in the mixture.

These zirconium chelates appear to be unique in their effect in combination with the specified organo-aluminium compounds in promoting the conversion of epoxides in high yield to high molecular weight products in reasonable periods of time. We have found no other metal chelate which produces as high yields in comparable reaction times and in general the use of other metal chelates either results in poor yields or in poor molecular weights or both.

Furthermore, the use of these zirconium chelate/organo-aluminium mixtures in the polymerization of epoxides unexpectedly causes an exothermic reaction which requires no heat or pressure and in this sense also the polymerization process is markedly superior to those used hitherto.

The chelating agent is an organic compound capable of existing in a form having a structure in which two carbonyl groups are linked to a common carbon atom; for example, a $\beta$-diketone or a compound in which at least one of the said carbonyl groups is part of a carboxylic acid or ester radical.

In particular, the chelates may be derived from organic compounds having the structure:

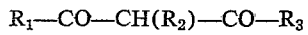

$$R_1\text{---CO---CH}(R_2)\text{---CO---}R_3$$

where $R_1$ and $R_3$ are each selected from monovalent hydrocarbon radicals or monovalent oxyhydrocarbon radicals or halogenated, preferably perfluorinated, derivatives thereof, and $R_2$ is hydrogen, a cyano group or an organic radical, particularly an alkyl or aryl group. Examples of such compounds are $\beta$-diketones such as acetylacetone, 3-methylacetylacetone, hexafluoroacetylacetone, 3-cyanoacetylacetone, 2,4-hexanedione, benzoylacetone and dipivaloylmethane; esters of ketoacids, for example alkylacetoacetates, alkyl propionylacetates, alkyl $\alpha$-acetopropionates and alkyl $\alpha$-acetobutyrates and esters of malonic acid or derivatives thereof, for instance diethyl malonate and diethyl cyanomalonate. Where high yields of high molecular weight materials are desired from the polymerizations using our initiator compositions, we prefer to choose the zirconium chelate from the group consisting of the acetylacetonate, the 3-cyanoacetylacetonate, the benzoylacetonate and the dipivaloyl methanate.

These chelating agents have two donor groups and form bidentate ligands with zirconium. The tetra chelates may be formed by reacting a zirconium salt with the chelating agent or its alkali metal salt in a diluent or solvent and preferably in the presence of a buffer, e.g. sodium acetate.

The aluminium trialkyls and the dialkyl aluminium halides which may be used may contain alkyl groups which may be the same or different. It is preferred that the alkyl radicals should contain not more than 6 carbon atoms, for example as in methyl, ethyl, isobutyl and hexyl. Higher alkyls than these may also be used if desired but appear to offer no significant advantage since the initiator compositions derived from the organo-aluminium compounds containing the lower alkyl radicals already have adequate solubility and activity. These organo-aluminium compounds are well known but as examples there may be cited aluminium triethyl, aluminium tri-isobutyl and diethyl aluminium chloride. The first is generally preferred for its general activity, solubility and ready availability.

The compositions of our invention may be prepared by interacting the zirconium chelate with the organo-aluminium compound in an inert solvent or diluent; that is, a solvent or diluent that reacts with neither of the components and preferably does not interfere with the polymerization in which the composition is used. The solvent is generally a hydrocarbon, for example heptane, hexane, benzene, toluene or mixtures thereof. The order of addition is immaterial. As the aluminium compounds are sensitive to oxygen and moisture, the process is preferably effected under substantially dry and oxygen-free conditions. The composition may then be separated from the solvent if desired but in general it is more easily handled as a solution. Conveniently, therefore, the amount of solvent used may be that required for dissolving the epoxide to form the eventual polymerization mixture.

The relative proportions of the components are such as to provide 1 to 6 atoms of aluminium for each atom of zirconium. With lower concentrations of the aluminium compound, both the yield and the molecular weight of the polymeric product suffer. With higher concentrations of the aluminum compound the advantages gained by the addition of the zirconium chelate tend to be lost.

The ratio of the aluminium compound to the zirconium chelate has an effect both on the yield of polymer obtained using the composition and on the molecular weight of the product. We have found that the use of compositions having from 3 to 6 aluminum atoms for each zirconium atom achieves almost quantitative yields of polymer, a ratio of from 4 to 5 aluminium atoms for each zirconium atom being preferred. On the other hand, for the highest molecular weights, we have found the best results are obtained using aluminium/zirconium ratios of from 1.5:1 to 5:1, preferably 1.5:1 to 4:1 and optimally about 2±0.4:1. For a useful combination of yield and molecular weight we generally use a ratio of about 4:1.

According to a further embodiment of our invention we have found that if our compositions are heat treated before use, they show improved activity as polymerization initiators; improvements in polymer yield or polymer molecular weight or both being observed.

The heat treatment may be effected by holding the composition at an elevated temperature until tests show that an improved initiator is obtained. Temperatures of from 50° to 100° C. are generally suitable, the time for the treatment being dependent upon the temperature used. Useful improvements have been obtained by us by holding the compositions in a boiling water bath for about 30 minutes; lower temperatures may require longer periods of time.

The compositions are moderately stable and may be kept under dry oxygen-free conditions for at least 24 hours, but we prefer to prepare them just prior to use.

As stated hereinbefore, these mixtures are suitable as epoxide polymerization initiators and promote rapid polymerization to high yields of high molecular weight products. In addition, they are generally soluble and may be used at temperatures and pressures that are lower than those required by conventional epoxide polymerization initiators.

According to a further embodiment of our invention, therefore, we provide a process for the polymerization of one or more epoxides wherein the polymerization initiator is the mixture as hereinbefore defined comprising a zirconium chelate and an organo-aluminium compound.

Epoxides which may be polymerized by our initiators include alkene oxides, for example ethylene oxide, propylene oxide, butene-1,2 - oxide, cyclohexene oxide, vinyl cyclohexene monoxide, isobutene oxide, pentene - 1,2-oxide and cyclooctadiene monoxide; halogenated alkene oxides, for example epichlorhydrin and epibromohydrin and glycidyl ethers as in phenyl glycidyl ether, methyl glycidyl ether and allyl glycidyl ether. Diepoxides may also be used but will generally lead to the production of insolube infusible resins. Mixtures of epoxides may also be used as desired.

Using our specified initiator compositions the polymerization may be carried out very conveniently at normal temperatures and pressures thereby avoiding the need for expensive heating and pressurizing equipment. However, higher or lower pressures and temperatures may be used if desired.

If the epoxide is not liquid at the chosen polymerization temperature a suitable solvent may be employed. This is generally a hydrocarbon, for example benzene, toluene, heptane, hexane or mixtures thereof, or a cyclic ether, for example dioxan or tetrahydrofuran. We prefer to use heptane.

A convenient method for carrying out the polymerization process comprises charging a predetermined quantity of zirconium chelate to a dry polymerization vessel, generally as a solution in an inert solvent or diluent, e.g. heptane and then flushing the vessel with nitrogen to remove air. The proportionate quantity of aluminium compound is then added, generally also as a solution in the same inert solvent or diluent, and the mixture subjected to the heat treatment, e.g. by heating it to 95–100° C. for about 30 minutes in a boiling water bath. The solution is then cooled to room temperature, epoxide is added and the solution stirred to effect polymerization which proceeds steadily and in a readily controlled manner.

The amount of initiator composition that may be used to obtain optimum results depends to some extent upon the concentrations of the individual components in the composition. In general, for quantities below 1 mole of zirconium chelate per 100 moles of epoxide, increasing the amount used increases the conversion of monomer to polymer. For most ratios, however, the results obtained using less than 1 mole of zirconium chelate per 1000 moles of epoxide do not justify the saving in cost. On the other hand, little additional advantage is gained in using more than 10 moles per 1000. For ratios of 4 aluminium atoms to 1 zirconium atom, very good yields are obtained using ca. 3 moles of zirconium per 1000 moles of epoxide and suitable concentrations for compositions having other ratios of organo-aluminum compound to zirconium chelate may be determined by simple experiment.

The time required depends upon the nature and concentration of the individual components of the initiator composition but in general polymerization is substantially complete after 24 hours and yields of the order of 90% of theoretical may be obtained within half that time.

In addition to the polymerization being exotheric and requiring no heat or pressure, products may be obtained therefrom having intrinsic viscosities measured on solutions thereof in benzene at 30° C., of 4 or more, thus providing high molecular weight solid compositions. Intrinisic viscosities greater than 10 have been achieved.

When polymerization is complete, the residues from the initiator system may be removed readily by extraction with an acid. The polymer may then be recovered, dried and treated as desired. For some applications, the residues from the initiator system are not harmful and need not be removed but are merely deactivated, for example by addition of an alcohol.

The invention is illustrated but not limited by the following examples in which the parts and percentages are by weight. Intrinsic viscosities were derived from measurements on solutions of the polymers in benzene at 30° C.

Example 1

Zirconium acetylacetonate (0.002 mole, 0.97 g.) and heptane (20 ml.) were charged to a polymerization tube fitted with an agitator and a tube through which a vacuum or a slight positive pressure of nitrogen could be applied. The tube was well flushed with nitrogen to remove air and moisture, and a solution of aluminium triethyl (0.008 mole, 0.912 g.) in heptane (5 ml.) was added by syringe through a serum cap in a stream of nitrogen. The solution was stirred and heated on a boiling water bath for 30 minutes giving a clear orange-coloured catalyst solution which was then cooled to room temperature.

Propylene oxide (0.2 mole, 11.6 g.) was then added to the catalyst and the resulting homogeneous solution was stirred. Rapid polymerization occurred and after about 60 minutes the solution became too thick to stir and was left to stand for 18–24 hours. The solid mass was discharged from the tube and dissolved in benzene (500 ml.). This solution was then extracted with a mixture of methanol (85 ml.) and concentrated hydrochloric acid (15 ml.) to remove the catalyst residues and water, and evaporated to dryness under vacuum to give a tough rubber which was dried under vacuum at 45° to constant weight. Approximately 10 g. of polymer were obtained.

Similar results may be obtained using zirconium tetra-(cyanodiethyl malonate) and zirconium tetra(hexafluoroacetylacetonate).

Examples 2–6

Following the process and using the apparatus described in Example 1, a series of polymerizations were effected using a variety of zirconium chelates. Propylene oxide was used as the monomer in each case and the ratio of aluminum triethyl to zirconium chelate was such as to give 4 atoms of aluminium for each atom of zirconium. The amount of initiator composition used was such as to give 1 mole of zirconium for each 100 moles of monomer.

The reaction conditions and results obtained are recorded in Table 1 below.

TABLE 1

| Example No. | Chelate of zirconium | Polymerization Time, hrs. | Polymerization Temp., °C. | Product Yield (g.) | Product I.V.[1] |
|---|---|---|---|---|---|
| 2 | $(CH_3CO)_2CH_2$ | 18 | 20 | 11.5 | 3.4 |
| 3 | $(CH_3CO)_2CHCN$ | 18 | 20 | 11.4 | 3.1 |
| 4 | $[C(CH_3)_3CO]_2CH_2$ | 18 | 20 | 9.6 | 3.7 |
| 5 | $C_6H_5CO \cdot CH_2COCH_3$ | 17 | 20/30 | 11.9 | 3.0 |
| 6 | $(C_2H_5OOC)_2CHCN$ | 24 | 20 | 7.9 | N.M. |

[1] I.V. stands for intrinsic viscosity in this and following examples. N. M. stands for not measured.

It may be noticed that the better results are obtained with the first four chelates.

By way of comparison, a series of similar polymerizations were attempted using chelates of other metals in combination with aluminium triethyl. The amount of initiator composition used in each case was that required to give 1 mole of chelate per 100 moles of propylene oxide and the reaction temperature was uniformly 20–25° C. The yield given in each case was the maximum obtainable with the chelate under test using the conditions described and the time recorded was that required to achieve that yield. The reaction variables and results obtained are recorded in Table 2 below.

TABLE 2

| Chelate[1] | Ratio[2] | Polymerization, Time (hrs.) | Yield (g.) | Polymer, I.V. |
|---|---|---|---|---|
| Al(acac)₃ | 3:1 | 72 | 10.4 | 4.1 |
| Be(acac)₂ | 2:1 | 96 | 5.3 | 1.7 |
| Co(acac)₃ | 3:1 | 4 | 4.2 | |
| Co(acac)₃ | [3] 6:1 | 24 | 1.7 | 0.7 |
| Co(3-nitroacac)₃ | 4:1 | 144 | Nil | |
| Cr(acac)₃ | 3:1 | 72 | 5.2 | |
| Cu(acac)₂ | 2:1 | 18 | 2.1 | |
| Fe(acac)₃ | 3:1 | 24 | [4] | |
| Mn(acac)₃ | 3:1 | 120 | | 3.1 |
| Pd(acac)₂ | 2:1 | 72 | Nil | |
| Pt(acac)₂ | 2:1 | 72 | Nil | |
| Rh(acac)₃ | 3:1 | 72 | 1.9 | |
| Th(acac)₄ | 4:1 | 72 | 10.8 | 2.4 |
| Tl(acac) | 4:1 | 72 | 2.7 | |
| VO(acac)₂ | 4:1 | 72 | 6.7 | 1.7 |

[1] Acac means acetylacetonate.
[2] Expressed as the number of aluminum atoms for each chelated metal atom.
[3] Aluminum diethyl chloride was used in place of aluminum triethyl.
[4] No solid.

It may be seen that in most cases the yield is low. In some cases (where homogeneous solution similar to those obtained with our chelates are obtained) yields comparable to those obtained using zirconium chelates are achieved, e.g. when the chelated metal is aluminium or thorium, but times of at least 72 hours are required. Of the rest, manganese was the most effective but required 120 hours.

Examples 7–14

A series of polymerizations were effected following the procedure and using the apparatus of Example 1. In each experiment, propylene oxide was polymerized using a combination of aluminium triethyl and zirconium acetylacetonate but the ratio of aluminium to zirconium in the composition was varied. Each polymerization was effected at 20–25° C. for 18 hours using an initiator composition containing 0.97 g. of zirconium chelate, the aluminium triethyl content being varied. 40 ml. of heptane were used as solvent in each case. Details and results are tabulated in Table 3 below.

TABLE 3

| Example No. | Ratio[1] | Propylene oxide (ml.) | Yield of polymer (g.) | Intrinsic viscosity of polymer |
|---|---|---|---|---|
| 7 | 1:1 | 20 | 2.1 | 0.9 |
| 8 | 2:1 | 20 | 8.1 | 8.5 |
| 9 | 2:1 | 40 | 10.5 | 10.5 |
| 10 | 3:1 | 20 | 17.2 | 4.7 |
| 11 | 4:1 | 20 | 17.2 | 3.8 |
| 12 | 4:1 | 40 | 29.4 | 4.9 |
| 13 | 5:1 | 20 | 17.1 | 2.9 |
| 14 | 6:1 | 20 | 16.9 | 2.6 |

[1] Expressed as the ratio of aluminium atoms to zirconium atoms in the initiator composition.

Example 15

The process of Example 11 was repeated but in this case the initiator composition was not subjected to heat treatment before use. 7.7 g. of polymer were obtained having an intrinsic viscosity of 1.55, demonstrating the marked benefit gained when heat treatment is used.

Examples 16–19

Following the procedure and using the apparatus of Example 1, a series of propylene oxide polymerizations were effected using different aluminium compounds. In each case, the chelate was zirconium acetylacetonate and the polymerization was effected in a solution of 20 ml. of heptane at 20° C. The concentration of chelate in each experiment was 0.97 g.

The polymerization variables and results obtained are found in Table 4 below which also gives the results obtained using two organo-metallic compounds wherein the metal is other than aluminium.

TABLE 4

| Example No. | Propylene oxide (ml.) | Organo-metallic compound | Ratio[1] | Polymerization Time (hrs.) | Polymer Yield (g.) | I.V. |
|---|---|---|---|---|---|---|
| 16 | 13.5 | AlEt₃ | 4:1 | 18 | 11.5 | 3.4 |
| 17 | 13.5 | AlBu₃ | 4:1 | 24 | 11.6 | 3.7 |
| 18 | 13.5 | AlEt₂Cl | 4:1 | 120 | 6.8 | 2.1 |
| 19 | 13.5 | AlEt₂Cl | 6:1 | 96 | 11.8 | 3.2 |
| | 13.5 | ZnEt₂ | 6:1 | 96 | Nil | |
| | 10.0 | Magnesium di (cpd.) | 4:1 | 72 | [2] | |

[1] Recorded as the ratio of the number of aluminium, zinc or magnesium atoms to the number of zirconium atoms in the initiator composition.
[2] No solid.

AlEt₃=Aluminium triethyl; AlBu₃=Aluminium tri-isobutyl; ZnEt₂=Zinc diethyl; Mgdi(cpd)=Magnesium di(cyclopentadienyl); AlEt₂Cl=Aluminium diethyl chloride.

Examples 20–25

A series of experiments were effected in which 11.6 g. of propylene oxide were polymerized at 20° C. in 20 ml. heptane with zirconium acetylacetonate and aluminium triethyl (in the ratio of 4 aluminium atoms for each zirconium atom) and using the procedure and apparatus described in Example 1. The amount of zirconium compound used was 0.97 g. in each case. In each experiment, the polymerization process was stopped after a predetermined time and the yield and inherent viscosity of the polymer were measured. The results are shown in tabular form below.

TABLE 5

| Example No. | Polymerization Time (hrs.) | Polymer Yield (g.) | Intrinsic viscosity |
|---|---|---|---|
| 20 | 1 | 3.7 | 5.4 |
| 21 | 2 | 4.2 | 6.0 |
| 22 | 4 | 7.9 | 8.9 |
| 23 | 8 | 10.5 | 6.8 |
| 24 | 16 | 11.5 | 9.1 |
| 25 | 24 | ¹ 12.1 | 9.7 |

¹ This material contained about 0.5 g. of catalyst residue due to incomplete extraction.

Examples 26–29

The polymerization procedure of Example 1 was repeated several times using 11.6 g. of propylene oxide, 0.97 g. of zirconium acetylacetonate and the required amount of aluminium triethyl to give four atoms of aluminium for each atom of zirconium. Each polymerization was effected in a different solvent the identity of which together with the results obtained are found in Table 6.

TABLE 6

| Example No. | Solvent | Polymerization Time (hrs.) | Polymer Yield (g.) | Intrinsic viscosity |
|---|---|---|---|---|
| 26 | Heptane (20 mls.) | 18 | 11.5 | 3.4 |
| 27 | Tetrahydrofuran (20 mls.) | 65 | 10.8 | (¹) |
| 28 | Benzene (20 mls.) | 18 | 11.1 | 3.4 |
| 29 | {Heptane (20 mls.) / Tetrahydrofuran (2 mls.)} | 18 | 11.0 | 3.1 |

¹ Not measured.

Examples 30–34

Using the procedure and apparatus described in Example 1, a variety of epoxides were polymerized using as initiator a combination of 0.97 g. of zirconium acetylacetonate and an amount of aluminium triethyl to give 4 aluminium atoms for each zirconium atom. The solvent in each case was 20 ml. of heptane and polymerization was effected at 20–25° C. The nature of the epoxide, the quantity used, the polymerization time and the yield of polymer in each experiment are tabulated below.

TABLE 7

| Example No. | Epoxide | Amount (mls.) | Polymerization Time (hrs.) | Yield (gms.) |
|---|---|---|---|---|
| 30 | Styrene oxide | 80 | 124 | 33.9 |
| 31 | Allyl glycidyl ether | 22.8 | 24 | 7.0 |
| 32 | Butene oxide-1,2 | 14.0 | 24 | 13.7 |
| 33 | Epichlorhydrin | 15.4 | 24 | 13.9 |
| 34 ¹ | Cyclohexene oxide-1,2 | 20 | 18 | 16.3 |

¹ The zirconium chelate was 1.42 g. of zirconium benzoylacetonate.

Examples 35–39

In each of a number of experiments, epichlorhydrin was polymerized in 20 ml. of heptane per gram of zirconium chelate at 20–25° C. for 18 hours. The procedure and apparatus used were as described in Example 1 and the initiator in each case was a combination of zirconium acetylacetonate and aluminium triethyl. The polymerization variables and the results obtained as set out in Table 8.

TABLE 8

| Example No. | Initiator Zr chelate (g.) | AlEt₃ (ml.) | Monomer (ml.) | Polymer Yield (percent of theoretical) |
|---|---|---|---|---|
| 35 | 1 | 4.5 | 30 | 76.2 |
| 36 | 2 | 9.9 | 40 | 63.1 |
| 37 | 3 | 13.5 | 60 | 82.2 |
| 38 | 6 | 27.0 | 150 | 64.3 |
| 39 | 2 | 4.5 | 40 | 22.9 |

In these experiments, the product was insoluble in the reaction medium.

Example 40

A catalyst solution was prepared exactly as in the procedure of Example 1, and butene oxide-1,2 (0.2 mole, 14 g.) instead of propylene oxide was then added. Polymerization occurred rather more slowly than the propylene oxide and stirring was continued for 18 hours at room temperature to complete it. The product was dissolved in benzene and extracted with methanolic hydrochloric acid as described in Example 1 to remove catalyst residues. The remaining benzene solution was evaporated to dryness and the polymer dried to constant weight. Approximately 13 g. of tough rubbery polymer were obtained, having an intrinsic viscosity of 5.7.

Example 41

The catalyst solution was prepared as in Example 1. To this solution was then added propylene oxide (0.2 mole, 11.6 g.) and epichlorhydrin (0.15 mole, 13.9 g.) and the resulting solution was stirred for as long as possible and then allowed to stand for 18 hours to complete polymerization.

The polymer mass was then thoroughly broken up in methanol (500 ml.) using a mechanical mixer, and the insolubule polymer was removed from the solution by centrifugation. The solid polymer was well washed with methanol to remove catalyst residues and dried to constant weight. The dry polymer was a tough, self adhesive rubber weighing 13 g. and showing some measure of crystallinity.

Example 42

Zirconium acetylacetonate (0.002 mole) and heptane (20 ml.) were charged to a polymerization tube fitted with an agitator and gas inlet tube. The tube was well flushed with nitrogen and aluminium diethyl chloride (0.012 mole) in heptane (5 ml.) was added. The solution was stirred and heated at 100° C. for 30 minutes to give a clear orange catalyst solution. Propylene oxide (0.2 mole) was added and the resulting solution was stirred and maintained at 35° C. for 24 hours. The polymer was dissolved in methanol to deactivate the catalyst and the solution was evaporated to give 2.5 g. of tough rubbery polymer.

Example 43

The process of Example 1 was repeated but in this case polymerization was effected for 4 hours at 20° C. 7.9 g. of polymer was obtained having an intrinsic viscosity in benzene at 25° C. of 4.7.

By way of comparison this experiment was repeated using cobalt tris(acetylacetonate) in place of the zirconium chelate. 4 hours polymerization at 20° C. gave only 4.2 g. of polymer having an intrinsic viscosity in benzene at 25° C. of 0.5.

Example 44

A catalyst solution was prepared as described in Example 1 and cooled to room temperature. To this solution was added 18.5 g. of epichlorhydrin. A mildly exothermic reaction occurred and polymer was deposited on the walls of the vessel after 30 minutes. The suspension was stirred for 18 hour and then discharged from the tube and broken up in excess methanol. Insoluble polymer was filtered off, washed with methanol to remove catalyst residues and dried. The yield was 10.6 g. of a tough rubber which could be cold drawn and showed birefringence typical of the presence of crystallinity.

A further 3.3 g. of soluble polymer which was a soft amorphous rubber by nature was isolated by evaporation of the methanol filtrate.

Example 45

1.17 g. of zirconium tetra(cyanoacetylacetonate) and 20 mls. of benzene which had been distilled from calcium hydride in a stream of nitrogen were charged to a polymerization tube fitted with a stirrer, a gas inlet and outlet and a liquid inlet closed by a serum cap. 0.008 gm. mole of aluminium triethyl was added by syringe through the serum cap and the suspension was heated with stirring in a boiling water bath for 30 minutes to give a clear orange solution.

This solution was cooled to 20° C. or below and 11.6 g. of propylene oxide was added to the tube. The solution was stirred for 18 hours and the product was then discharged from the tube and dissolved in benzene. This solution was extracted once with a solution of 15 ml. of hydrochloric acid and 85 ml. methanol. The benzene solution was then evaporated to dryness, finally under vacuum, to give 10.1 g. of high molecular weight polymer.

Example 46

1.56 g. of zirconium tetra(dipivaloyl methanate) was charged to a polymerization tube which had been evacuated and flushed with nitrogen to remove air and moisture. 20 ml. of heptane which had been distilled from calcium hydride in a stream of nitrogen and 0.912 g. of aluminium triethyl was then added to the tube. The solution was heated for 30 minutes in a boiling water bath and an atmosphere of nitrogen and then cooled to room temperature.

11.6 g. of propylene oxide was added to the tube and the solution was stirred for 18 hours; cooling in a water bath being necessary in the early stages of the polymerization to control the exothermic reaction. The product obtained was dissolved in benzene and the solution extracted with methanolic hydrochloric acid as described in Example 1 to remove catalyst residues. The solution was then evaporated to give 8.5 g. of a tough rubber having an intrinsic viscosity in benzene at 30° C. of 3.7.

Example 47

A catalyst solution was prepared as described in Example 1 from 0.97 g. of zirconium tetra(acetylacetonate) and 0.912 g. of aluminium triethyl. 5.8 g. of propylene oxide and 13.6 g. of phenyl glycidyl ether were added to the solution and the mixture was stirred for 42 hours. The product was broken up in methanol using a high speed agitator and the white insoluble polymer was filtered off and dried in vacuo to give 16.8 g. of a tough rubbery copolymer.

The zirconium tetra(diethyl cyanomalonate) referred to in Examples 1 and 6, the zirconium tetra(cyanoacetylacetonate) referred to in Examples 3 and 45 and the zirconium tetra(dipivaloyl methanate) referred to in Examples 4 and 46 were prepared by the methods described in Examples 3, 2 and 1 of our copending British patent application No. 27,049/65.

I claim:

1. In a process for the polymerization of 1,2-epoxides by contacting at least one monomeric 1,2-epoxide free of interfering functional groups with an anionic initiator system, the improvement which comprises using as the initiator system a composition comprising (i) a tetra($\beta$-diketo chelate) of zirconium and (ii) an aluminum alkyl selected from aluminum trialkyls and dialkyl aluminum halides, the ratio of (i) to (ii) being chosen to give from 1.5 to 6 aluminum atoms for each zirconium atom in the composition.

2. A process which comprises the steps of (i) adding to a tetra($\beta$-diketo chelate) of zirconium an aluminum alkyl selected from the group consisting of aluminum trialkyls and dialkyl aluminum halides, the amount of aluminum alkyl being such as to give from 1.5 to 6 atoms of aluminum for each atom of zirconium and the addition being effected in an inert organic solvent under substantially dry and oxygen-free conditions, (ii) subjecting the solution so formed to a heat treatment to improve its activity as an epoxide polymerization initiator, (iii) adjusting it to the polymerization temperature, (iv) adding at least one polymerizable monomeric 1,2-epoxide free of interfering functional groups in an amount to give from 100 to 1000 moles of epoxide per mole of zirconium chelate, and (v) separating the polymer so formed.

3. A process according to claim 1 in which the composition which has been subjected to a heat treatment to improve its activity as an epoxide polymerization initiator.

4. A process according to claim 3 in which the heat treatment is effected at a temperature of from 50 to 100° C.

5. A process according to claim 4 in which the heat treatment is effected by heating in a boiling water bath for about 30 minutes.

6. A process according to claim 1 in which the zirconium chelate is selected from zirconium tetra(acetylacetonate), zirconium tetra(3-cyanoacetylacetonate), zirconium tetra(benzoylacetonate) and zirconium tetra(dipivaloylmethanate).

7. A process according to claim 1 in which the alkyl groups of the aluminum alkyl each contain from 1 to 6 carbon atoms.

8. A process according to claim 7 in which the aluminum alkyl is aluminum triethyl.

9. A process according to claim 1 in which the ratio of (i) to (ii) is chosen to give from 4 to 5 aluminum atoms for each zirconium atom.

10. A process according to claim 1 in which the ratio of (i) to (ii) is chosen to give from 1.6 to 2.4 aluminum atoms for each zirconium atom.

11. A process according to claim 1 in which the initiator is used in a concentration to give from 1 to 10 moles of zirconium chelate per 1000 moles of 1,2-epoxide.

12. A process according to claim 11 in which the initiator contains about 4 atoms of aluminum for each atom of zirconium and is used in a concentration to give about 3 moles of zirconium per 1000 moles 1,2-epoxide.

13. A process according to claim 2 in which the inert solvent or diluent is a hydrocarbon.

14. A process according to claim 13 in which the inert solvent or diluent is n-heptane.

References Cited

UNITED STATES PATENTS

| 2,977,350 | 3/1961 | Fasce et al. | 260—94.9 |
| 3,067,175 | 12/1962 | Sullivan et al. | 260—2 |
| 3,127,371 | 3/1964 | Garty et al. | 260—2 |

OTHER REFERENCES

J. of Polymer Science, vol. 51, issue 156, Kambara et al. (1961) (pages S7–S10 relied on).

WILLIAM H. SHORT, *Primary Examiner.*

T. E. PERTILLA, *Assistant Examiner.*